United States Patent
Imaki et al.

(10) Patent No.: US 8,956,057 B2
(45) Date of Patent: Feb. 17, 2015

(54) OPTICAL FIBER CONNECTOR

(71) Applicants: Japan Aviation Electronics Industry, Limited, Tokyo (JP); Asahi Glass Company, Limited, Tokyo (JP)

(72) Inventors: Osamu Imaki, Tokyo (JP); Hideto Shimazu, Tokyo (JP); Yuji Watanabe, Tokyo (JP); Minoru Sekine, Tokyo (JP)

(73) Assignees: Japan Aviation Electronics Industry, Limited, Tokyo (JP); Asahi Glass Company, Limited, Tokyo (JP)

( * ) Notice: Subject to any disclaimer, the term of this patent is extended or adjusted under 35 U.S.C. 154(b) by 59 days.

(21) Appl. No.: 13/688,578

(22) Filed: Nov. 29, 2012

(65) Prior Publication Data

US 2013/0195407 A1    Aug. 1, 2013

(30) Foreign Application Priority Data

Jan. 31, 2012   (JP) ................................. 2012-018210

(51) Int. Cl.
*G02B 6/36*   (2006.01)
*G02B 6/38*   (2006.01)

(52) U.S. Cl.
CPC ................ *G02B 6/36* (2013.01); *G02B 6/3821* (2013.01); *G02B 6/3869* (2013.01); *G02B 6/3893* (2013.01); *G02B 6/3898* (2013.01)
USPC .............................................. 385/84; 385/78

(58) Field of Classification Search
CPC ............................ G02B 6/3869; G02B 6/3887
USPC ....................................................... 385/78, 84
See application file for complete search history.

(56) References Cited

U.S. PATENT DOCUMENTS

| 7,226,215 B2 | 6/2007 | Bareel et al. |
| 7,621,676 B2 | 11/2009 | Nakagawa et al. |
| 8,851,765 B2 | 10/2014 | Larson et al. |
| 2006/0104590 A1* | 5/2006 | Yamaguchi et al. .......... 385/136 |

FOREIGN PATENT DOCUMENTS

| CN | 101546017 A | 9/2009 |
| JP | 10197741 A | 7/1998 |

(Continued)

OTHER PUBLICATIONS

Korean Office Action dated Oct. 27, 2013 (and English translation thereof) in counterpart Korean Application No. 10-2012-0131414.

(Continued)

*Primary Examiner* — Jerry Blevins
(74) *Attorney, Agent, or Firm* — Holtz, Holtz, Goodman & Chick, PC

(57) ABSTRACT

An optical fiber connector comprises a ferrule having a rear end, a chuck located rearward of the ferrule, a ring having a front end, and a coil spring. The ring is attached to the chuck so as to surround the chuck. The optical fiber connector holds an optical fiber which is inserted from a rear end of the optical fiber connector. In detail, when the optical fiber is inserted into the optical fiber connector, an end of the optical fiber passes through the chuck to be accommodated in the ferrule. The coil spring presses the ring forward (toward the ferrule) so that the chuck is squeezed to hold the inserted optical fiber. When the ring is moved rearward by a stopper inserted between the rear end of the ferrule and the front end of the ring, the chuck is released to release the optical fiber.

8 Claims, 10 Drawing Sheets

(56) References Cited

FOREIGN PATENT DOCUMENTS

| | | |
|---|---|---|
| JP | 2001-249251 A | 9/2001 |
| JP | 2004037718 A | 2/2004 |
| JP | 2006-39560 A | 2/2006 |
| JP | 2011-039288 A | 2/2011 |
| KR | 2009-0103748 A | 10/2009 |
| TW | 296807 B | 1/1997 |
| TW | 201100893 A | 1/2011 |

OTHER PUBLICATIONS

Canadian Office Action dated Jul. 25, 2014 in counterpart Canadian Application No. 2,796,698.

Chinese Office Action dated Jun. 19, 2014 in counterpart Chinese Application No. 201210505092.X.

Taiwanese Office Action dated Oct. 2, 2014 in counterpart Taiwanese Application No. 101143192.

* cited by examiner

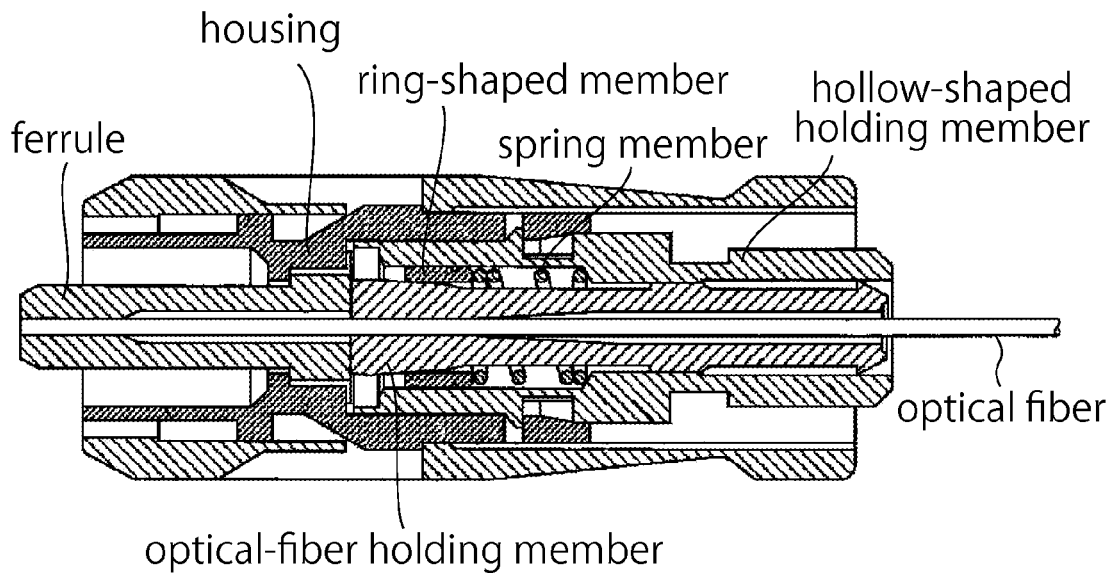
PRIOR ART  FIG. 19
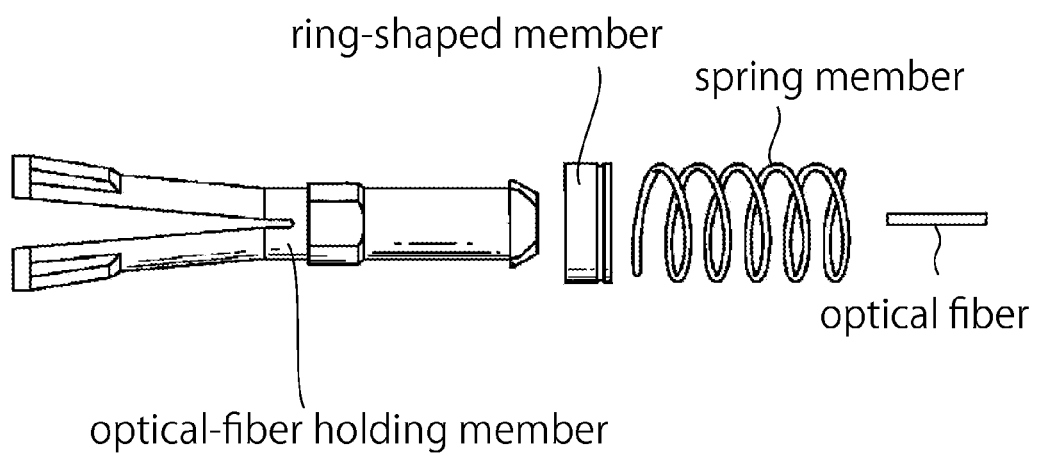
PRIOR ART  FIG. 20

OPTICAL FIBER CONNECTOR

CROSS REFERENCE TO RELATED APPLICATIONS

Applicants claim priority under 35 U.S.C. §119 of Japanese Patent Applications No. JP2012-018210 filed Jan. 31, 2012.

BACKGROUND OF THE INVENTION

This invention relates to an optical fiber connector configured to be attached to an end of an optical fiber.

For example, an optical fiber connector which is able to hold an optical fiber without using an adhesive is disclosed in JP-A 2001-249251, contents of which are incorporated herein by reference.

As shown in FIGS. 19 and 20, the optical fiber connector of JP-A 2001-249251 comprises a ferrule having a front end and a rear end, an optical-fiber holding member having a front end and a rear end, a ring-shaped member, a spring member, a hollow-shaped holding member and a housing. The front end of the optical-fiber holding member opens in an initial state. The optical fiber is held by the optical fiber connector as described below. At first, the ring-shaped member and the spring member are attached on an outer surface of the optical-fiber holding member from the rear end of the optical-fiber holding member. Then, the optical-fiber holding member is inserted into the hollow-shaped holding member together with the ring-shaped member and the spring member. Then, the optical fiber is inserted into the optical-fiber holding member from the rear end of the optical-fiber holding member so as to pierce the optical-fiber holding member. The optical-fiber, which passes through the optical-fiber holding member, is inserted from the rear end of the ferrule. The inserted optical-fiber pierces the ferrule to project from the front end of the ferrule. Then, the housing is moved rearward from the front end of the ferrule so as to cover the ferrule. The moved housing and the hollow-shaped holding member are mated with each other so as to accommodate the optical-fiber holding member, the ring-shaped member and the spring member therewithin. The accommodated spring member pushes the ring-shaped member so that the ring-shaped member is pressed against forward. Accordingly, the front end of the optical-fiber holding member is closed. The closed front end of the optical-fiber holding member tightens the optical fiber so that the optical fiber is held by the optical-fiber holding member.

As described above, the optical fiber connector of JP-A 2001-249251 has a structure which enables easy work when focusing on the holding of the optical fiber. However, it is necessary to assemble parts one by one so as to hold the optical fiber when assembling the optical fiber connector. Accordingly, the optical fiber connector of JP-A 2001-249251 has a problem that the working time becomes long. Moreover, the members might be missed when the optical fiber connector is attached to the optical fiber at a dark place such as a building construction site. The optical fiber connector of JP-A 2001-249251 also has a problem that the optical fiber connector should be disassembled when the optical fiber is exchanged after the optical fiber connector is assembled.

SUMMARY OF THE INVENTION

It is therefore an object of the present invention to provide an optical fiber connector which is attachable to an optical fiber more easily and reliably while does not easily damaged even when the optical fiber is exchanged repeatedly.

One aspect of the present invention provides an optical fiber connector configured to hold an optical fiber having an end and to be operable by a stopper. The optical fiber connector comprises a ferrule having a facing portion, a housing having a side surface which is formed with a stopper-insert-hole, a holding member, a maintaining member having an abutment portion, and a pressing member. The ferrule is able to accommodate the end of the optical fiber. The housing holds the ferrule so that the ferrule is movable in an optical direction which is parallel to an optical axis of the held optical fiber. The holding member is accommodated in the housing so as to be movable in the optical direction and to be able to transit between a hold sate where the holding member holds the optical fiber and a release state where the holding member releases the optical fiber. The maintaining member is accommodated in the housing so as to be movable relative to the holding member in the optical direction. The maintaining member is locatable at a maintain position where the maintaining member maintains the holding member in the hold state and a release position where the holding member is able to transit to the release state. The abutment portion faces the facing portion of the ferrule in the optical direction so that the stopper is insertable between the abutment portion and the facing portion through the stopper-insert-hole along a direction crossing the optical direction. The pressing member presses the maintaining member toward the maintain position. The pressed maintaining member keeps a position located apart from the ferrule in the optical direction by a predetermined distance defined by a size of the stopper while resisting the pressing member under an inserted state where the stopper is inserted between the abutment portion and the facing portion.

An appreciation of the objectives of the present invention and a more complete understanding of its structure may be had by studying the following description of the preferred embodiment and by referring to the accompanying drawings.

BRIEF DESCRIPTION OF THE DRAWINGS

FIG. 19 is a cross-sectional view showing an existing optical fiber connector.

FIG. 20 is a plan view showing members, which are uses to hold the optical fiber, of the existing optical fiber connector of FIG. 19.

Figure 1:
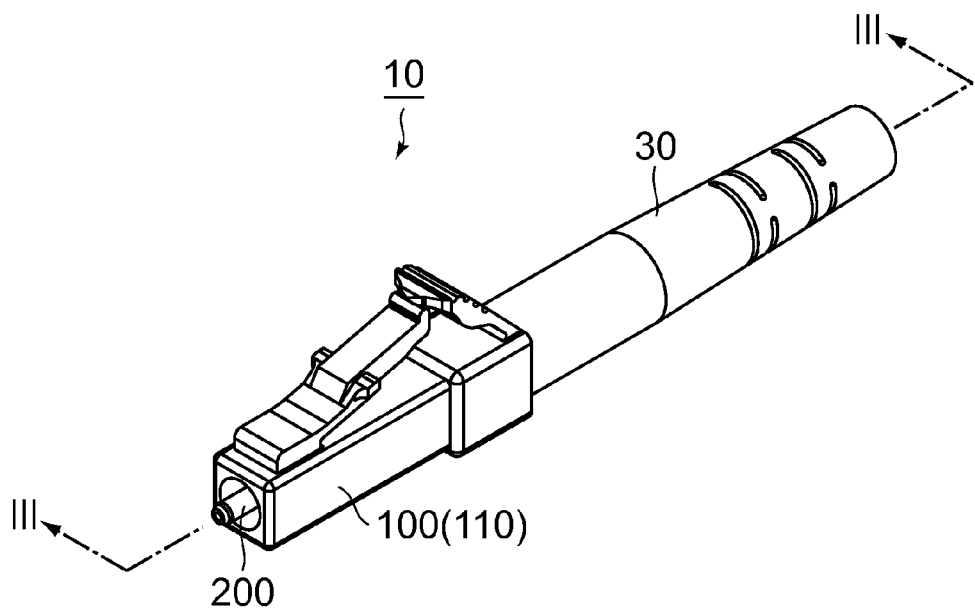
FIG. 1 is a perspective view mainly showing a side surface (i.e. a side surface which is not formed with a stopper-insert-hole) of an optical fiber connector according to an embodiment of the present invention, wherein a connector boot is attached to the optical fiber connector.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
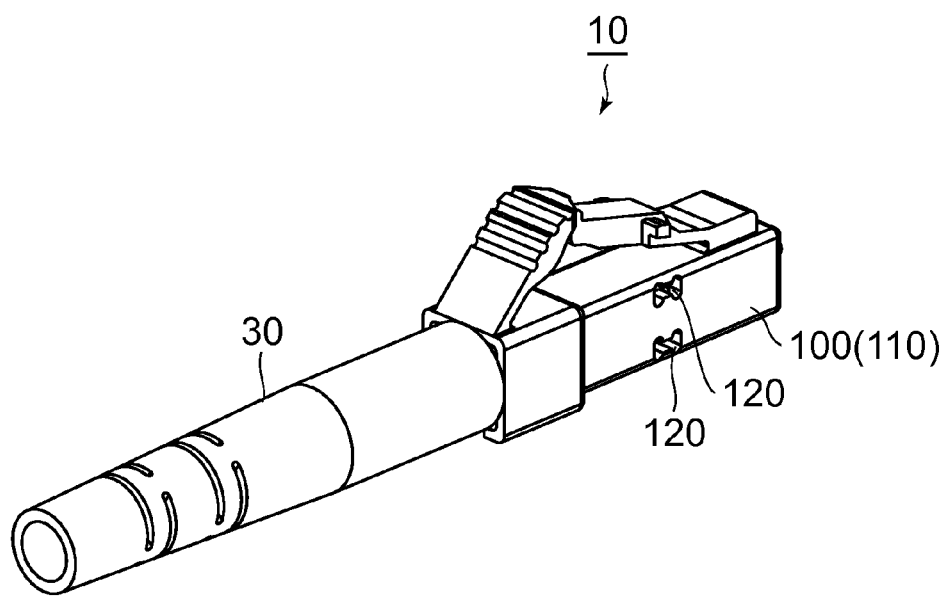
FIG. 2 is another perspective view mainly showing another side surface (a side surface which is formed with the stopper-insert-hole) of the optical fiber connector of FIG. 1.
Figure 3:
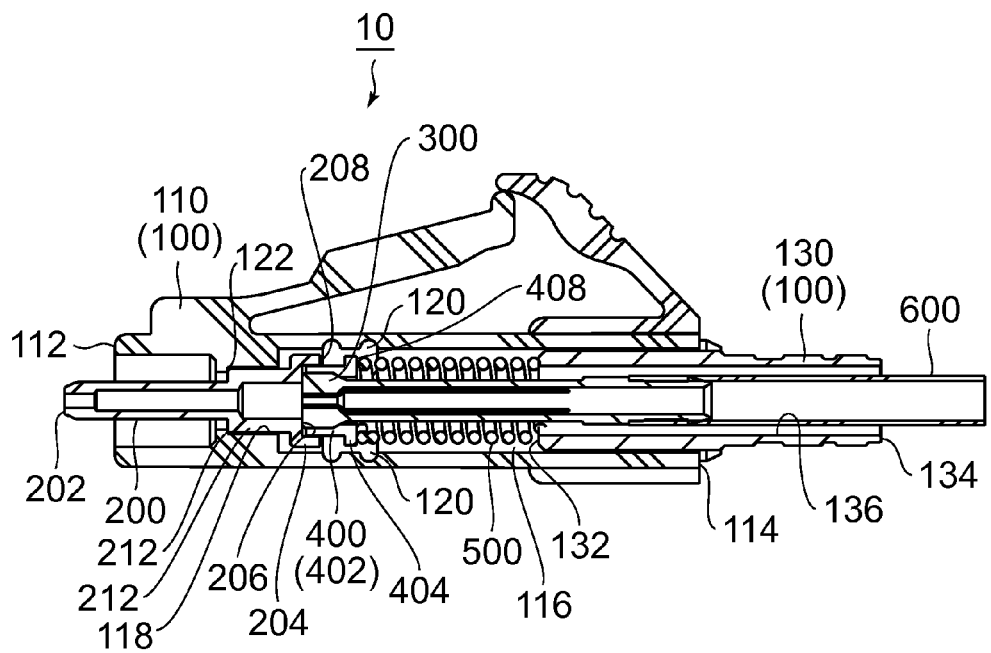
FIG. 3 is a cross-sectional view showing the optical fiber connector of FIG. 1, taken along lines III-III, wherein the connector boot shown in FIG. 1 is detached.
Figure 13:
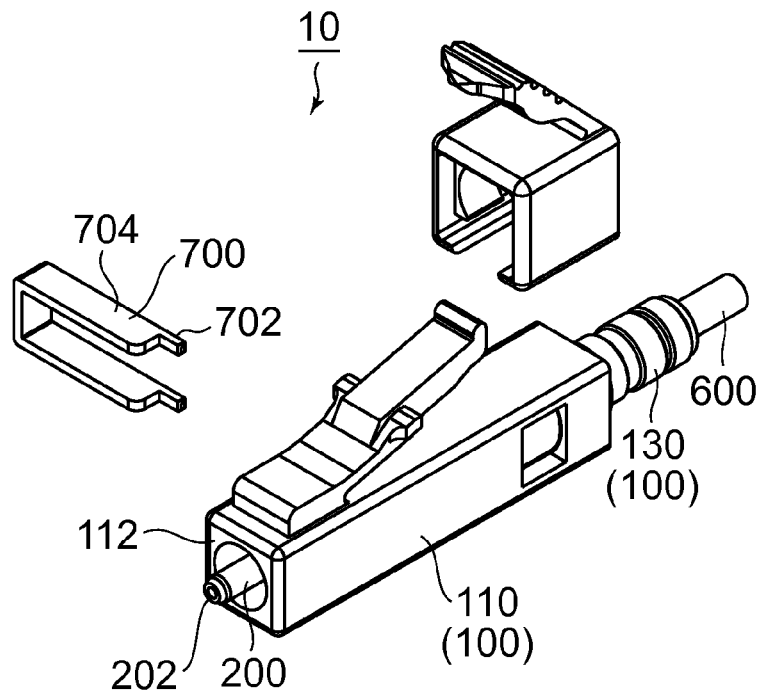
FIG. 13 is a perspective view showing the optical fiber connector of FIG. 1 together with the stopper, wherein the connector boot is not attached to the optical fiber connector, and the stopper is not yet inserted in a housing of the optical fiber connector.
Figure 14:
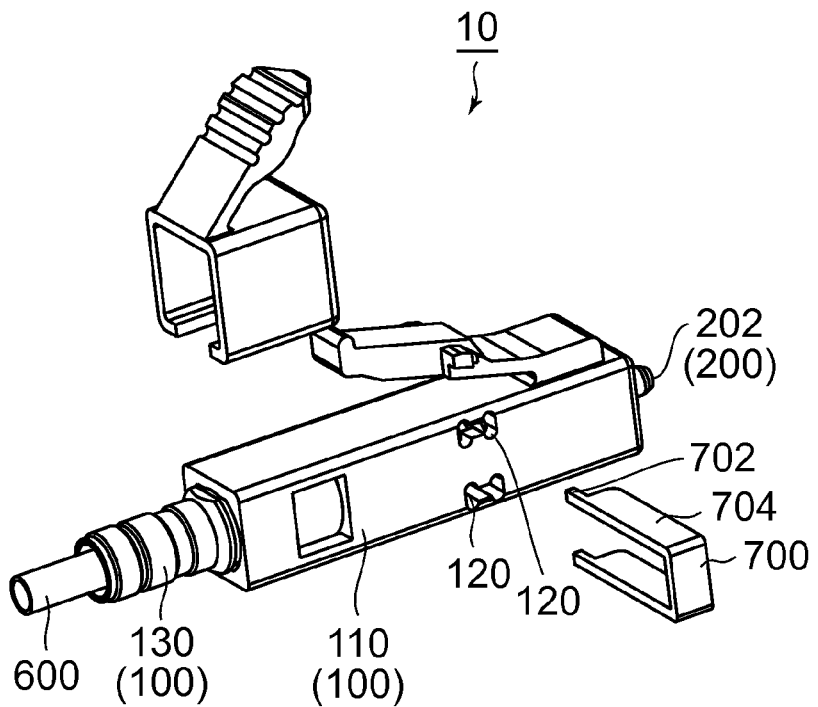
FIG. 14 is a perspective view showing the optical fiber connector of FIG. 2 together with the stopper, wherein the connector boot is not attached to the optical fiber connector, and the stopper is not yet inserted in the housing.

Referring to FIGS. 1 to 4, an optical fiber connector 10 according to an embodiment of the present invention comprises a housing 100 which includes a front housing 110 made of an insulating material and a back post 130 made of a metal, a ferrule 200, a chuck (holding member) 300, a ring (maintaining member) 400, a coil spring (pressing member) 500 and a tube (release-operation member) 600 made of an elastic material. The optical fiber connector 10 is configured to hold an optical fiber (not shown) having an end. In detail, the optical fiber connector 10 is configured so that the end of the held optical fiber (not shown) faces forward in an optical direction which is parallel to an optical axis of the optical fiber (not shown). Moreover, the optical fiber connector 10 is configured to be operable by a stopper 700 other than the optical fiber connector 10. The stopper 700 is used as a tool when exchanging the optical fiber (not shown). As shown in FIGS. 3, 13 and 14, the stopper 700 has a body and two arms which extend from opposite ends of the body, respectively, so that the stopper 700 has a U-like shape. Each of the arms (i.e. the stopper 700) has a narrow portion 702 formed at an end thereof and a broad portion 704 extending continuously from the narrow portion 702 to the body portion. The narrow portion 702 has a width narrower (i.e. smaller) than the broad portion 704. In other words, the broad portion 704 has a width wider (i.e. larger) than the narrow portion 702.

The back post 130 according to the present embodiment has a cylindrical shape. In detail, the back post 130 has a front end 132 and a rear end 134 on opposite ends in the optical direction. The back post 130 has a through hole 136 which pierces between the front end 132 and the rear end 134. As shown in FIG. 3, the front housing 110, similar to the back post 130, has a front end 112 and a rear end 114 in the optical direction, and a space which pierces between the front end 112 and the rear end 114. In other words, the front housing 110 is pierced from the front end 112 to the rear end 114. In detail, the front housing 110 has an accommodating space 116 formed therewithin. The accommodating space 116 is provided at a rear side (i.e. a side where the rear end 114 is located) of the front housing 110. The accommodating space 116 mainly accommodates the chuck 300 and the ring 400. The front housing 110 is further provided with a guide portion 118 therewithin. The guide portion 118 is a hole having a rectangular shape. The guide portion 118 is located nearer to the front end 112 than the accommodating space 116 so as to make a conjunction with the accommodating space 116. The guide portion 118 has a bottom portion (i.e. a portion which is near to the front end 112). The bottom portion of the guide portion 118 communicates with the front side space of the front housing 110 (i.e. a space formed at the front end 112 of the front housing 110) so as to be formed with a step portion 122. As shown in FIGS. 2, 3 and 14, the front housing 110 (i.e. the housing 100) has a side wall (i.e. side surface) which is formed with a stopper-insert-hole 120. The stopper-insert-hole 120 is used for the stopper 700 to be inserted into the accommodating space 116. As can be seen from FIGS. 3 and 4, the back post 130 according to the present embodiment is press-fitted into the rear end 114 of the front housing 110 so that the back post 130 is installed. As shown in FIGS. 1 and 2, the back post 130 is covered with a connector boot 30 when the optical fiber connector 10 is used.

Figure 5:
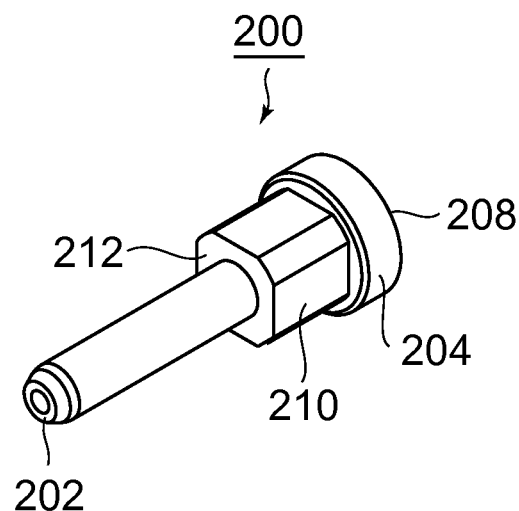
FIG. 5 is a perspective view showing a ferrule of the optical fiber connector of FIG. 4.
Figure 6:
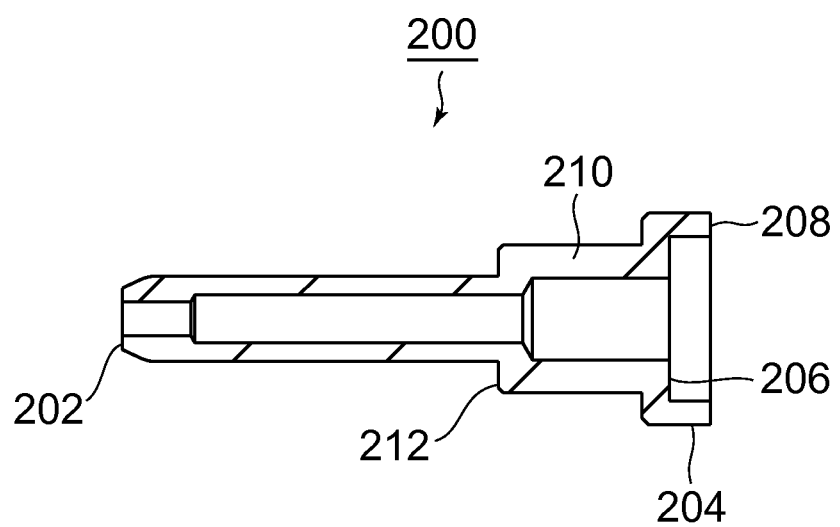
FIG. 6 is a cross-sectional view showing the ferrule of FIG. 5.

As shown in FIGS. 5 and 6, the ferrule 200 is pierced from a front end 202 to a rear end so as to be able to accommodate the end of the optical fiber (not shown). When the end of the optical fiber (not shown) is accommodated in the ferrule 200 (i.e. when the optical fiber connector 10 is attached to the end of the optical fiber (not shown)), the optical fiber (not shown) extends along the optical direction. The rear end side of the ferrule 200 is formed with a receiving portion 204. In other words, the receiving portion 204 constitutes the rear end of the ferrule 200. The receiving portion 204 is formed with a recess which is recessed toward the front end 202. The receiving portion 204 according to the present embodiment has a larger size than the other parts of the ferrule 200 in a plane perpendicular to the optical direction. The receiving portion 204 has a receiver 206 formed on a bottom portion (i.e. a bottom of the recess) thereof. The receiver 206 according to the present embodiment is perpendicular to the optical direction. The receiving portion 204 (i.e. the ferrule 200) further has a rim portion (facing portion) 208. The rim portion 208 is formed on a rear end of the receiving portion 204 so as to enclose a rear end of the recess in a plane perpendicular to the optical direction. As can be seen from the above description, the rim portion 208 of the receiving portion 204 is a portion which has the largest size in a plane perpendicular to the optical direction. Accordingly, the rim portion 208 is visible when seen from the rear of the ferrule 200. The ferrule 200 is further provided with a guided portion 210 having a rectangular column shape (or an angular shape) and a part located forward of the guided portion 210. The guided portion 210 is formed at a side where the front end 202 is located. In other words, the guided portion 210 is formed forward of the receiving portion 204. The part located forward of the guided portion 210 is slenderer than the guided portion 210 so that the ferrule 200 has a step portion 212 which is provided forward of the guided portion 210. The guided portion 210 is guided by the guide portion 118 of the front housing 110 when the ferrule 200 is inserted into and attached to the front housing 110. Upon the insertion of the ferrule 200, the step portion 212 of the ferrule 200 is brought into abutment with the step portion 122 (i.e. hits the step portion 122 to be brought into contact with the step portion 122). This abutment defines a maximum length (i.e. a maximum projecting length) of a projecting part of the ferrule 200 which projects from the front end 112 of the front housing 110.

Figure 7:
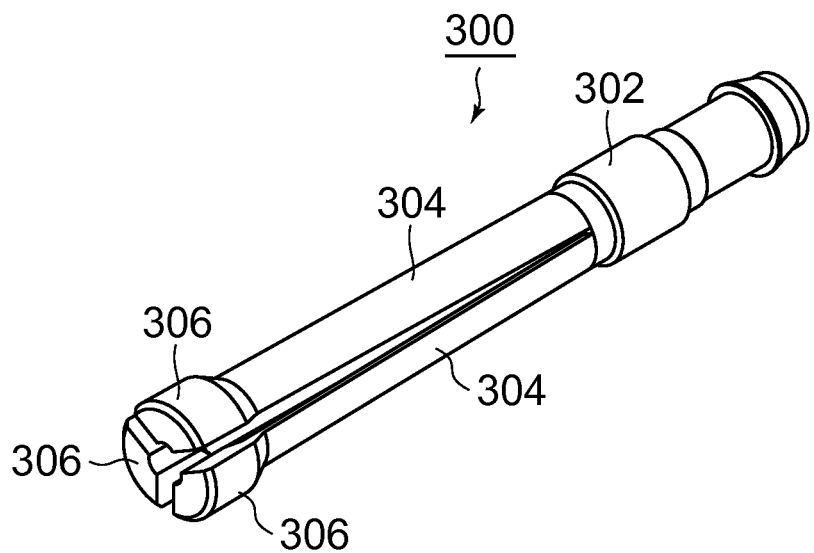
FIG. 7 is a perspective view showing a chuck of the optical fiber connector of FIG. 4.

As shown in FIG. 7, the chuck (holding member) 300 has a base portion 302, a resilient portion 304 and a holding portion 306. The base portion 302 has a cylindrical shape. The resilient portion 304 extends forward from the base portion 302 so as to resiliently support the holding portion 306. The base portion 302 according to the present embodiment is a rear end portion of the chuck 300. As can be seen from FIGS. 3 and 4, the base portion 302 of the chuck 300 is attached with the tube 600. Referring to FIG. 7, the chuck 300 according to the present embodiment has three (i.e. a plurality of) sets, each consisting of the one holding portion 306 and the one resilient portion 304, for the one optical fiber (not shown). Accordingly, the chuck 300 has a holding group consisting of the three (i.e. a plurality of) holding portions 306 and a resilient group consisting of the three (i.e. a plurality of) resilient portions 304. The holding portion 306 has a rear end portion configured to guide the ring 400 as described later. The rear end portion of the holding portion 306 is tapered off as extending rearward.

As shown in FIG. 7, the holding portions 306 of the chuck 300 open outward in a radius direction perpendicular to the optical direction under an initial state where the chuck 300 does not receive any force. A position of the holding portion 306, where the holding portions 306 open, (i.e. a position shown in FIG. 7) is referred to as an "unhold position". The optical fiber (not shown) is able to pass through the inside of the chuck 300 when the holding portions 306 are located at the unhold position. Accordingly, if the chuck 300 which holds the optical fiber (not shown) moves to the unhold position, the held optical fiber (not shown) is released. More specifically, the optical fiber (not shown) becomes to be freely movable through the chuck 300 in the optical direction. If the chuck 300 which does not yet hold the optical fiber (not shown) moves to the unhold position, the optical fiber (not shown) is able to be inserted into and to pass through the inside of the chuck 300. As described above, the resilient portion 304 under the initial state resiliently supporting the holding portion 306 so that the holding portion 306 is located at the unhold position where the holding portion 306 unholds (i.e. releases or does not hold) the optical fiber (not shown). As can be seen from FIGS. 7 and 11, the open holding portions 306 are able to be closed. Another position of the holding portion 306, where the holding portions 306 close (see FIG. 11), is referred to as a "hold position". When the holding portions 306 move inward in the radius direction while resisting the resilient force, the holding portion 306 is located at the hold position. In other words, by resiliently deforming the resilient portion 304, the holding portion 306 is movable to the hold position where the holding portion 306 holds the optical fiber (not shown). According to the present embodiment, the holding portion 306 is located at the hold position when the three holding portions 306 gather toward the center in the radius direction. The optical fiber (not shown) is held by the holding portions 306 when the holding portions 306 are located at the hold position so that the optical fiber (not shown) is prevented from moving in the optical direction. According to the present embodiment, the optical fiber (not shown) is grasped by the three holding portion 306 so as to be held more securely. As can be seen from the above description, the unhold position is located outer than the hold position in the radius direction of the held optical fiber (not shown).

Figure 8:
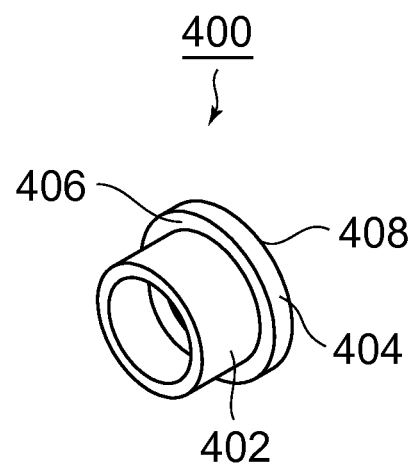
FIG. 8 is a perspective view showing a ring of the optical fiber connector of FIG. 4.

As shown in FIG. 8, the ring 400 has a body portion 402 and a flange 404. The body portion 402 has a low height cylindrical shape. The flange 404 is provided at a rear side of the body portion 402. The flange 404 has a circular shape having a larger diameter than the body portion 402 so that the flange 404 protrudes from the body portion 402 in the radius direction. Accordingly, the flange 404 (i.e. the ring 400) has a front end (abutment portion) 406 on the protruding part thereof, and a rear end 408 opposite to the front end 406. As can be seen from the above description, the front end 406 of the flange 404 is visible when seen from the front of the ring 400. The rear end 408 of the flange 404 is visible when seen from the rear of the ring 400. An external diameter of the body portion 402 of the ring 400 is smaller than an internal diameter of the receiving portion 204 of the ferrule 200. In other words, the outer surface of the body portion 402 of the ring 400 has a smaller size than the inner surface of the receiving portion 204 in a plane perpendicular to the optical direction. In addition, a size of the body portion 402 in the optical direction is sufficiently larger than a size of the receiving portion 204 in the optical direction.

As shown in FIGS. 3 and 7 to 12, the ring 400 is attached to the outer surface of the chuck 300 so as to enclose a part of the chuck 300. In other words, a part of the chuck 300 is inserted in the ring 400. More specifically, the ring 400 (especially, the cylinder of the body portion 402) encloses at least one of the resilient portion 304 and the holding portion 306 from the outside in the radius direction. Especially, according to the present embodiment, the ring 400 encloses at least one group of the holding group and the resilient group from the outside in the radius direction.

Figure 9:
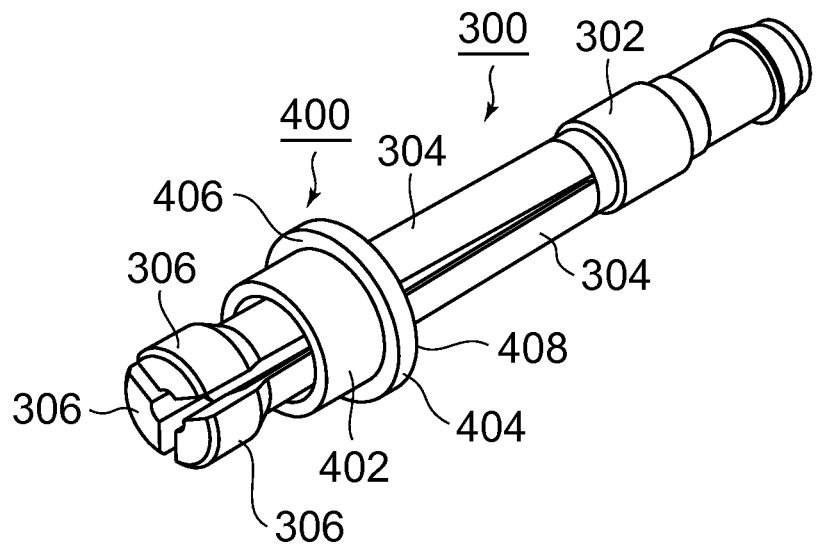
FIG. 9 is a perspective view showing the chuck of FIG. 7 in a state where the ring of FIG. 8 is attached, wherein the ring is located at a release position, and a holding portion of the chuck is located at an unhold position.
Figure 10:
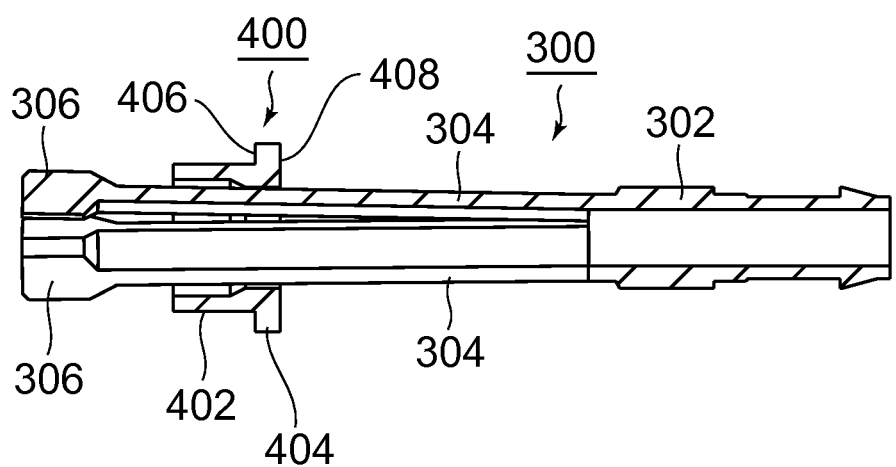
FIG. 10 is a cross-sectional view showing the chuck and the ring of FIG. 9.

When the chuck 300 is in a state (i.e. a release state) shown in FIGS. 9 and 10, the ring 400 partially encloses the resilient portions 304 of the chuck 300 from the outside in the radius direction while the resilient portions 304 do not receive from the ring 400 such a force that deforms the resilient portions 304. A position of the ring 400 under the release state of the chuck 300 is referred to as a "release position". Each of the holding portions 306 is located at the unhold position when the ring 400 is located at the release position.

Figure 11:
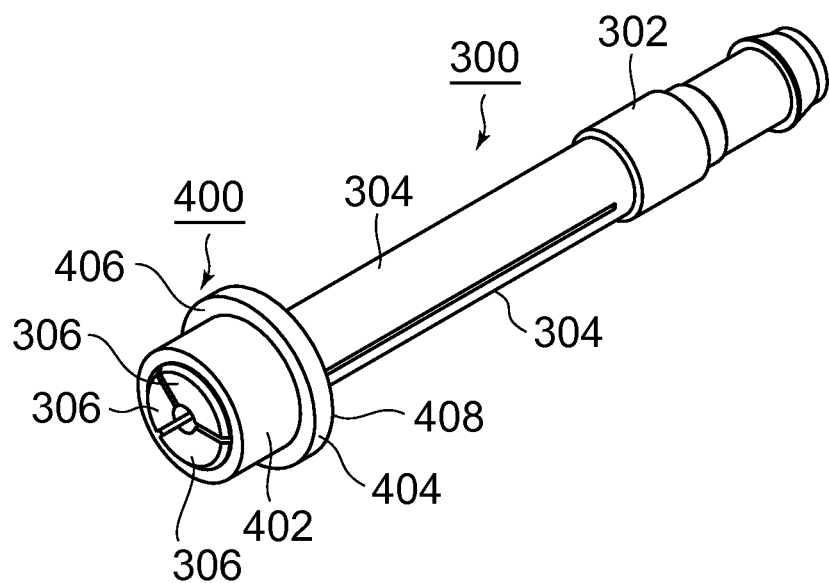
FIG. 11 is another perspective view showing the chuck of FIG. 7 in another state where the ring of FIG. 8 is attached, wherein the ring is located at a maintain position, and the holding portion of the chuck is located at a hold position.
Figure 12:
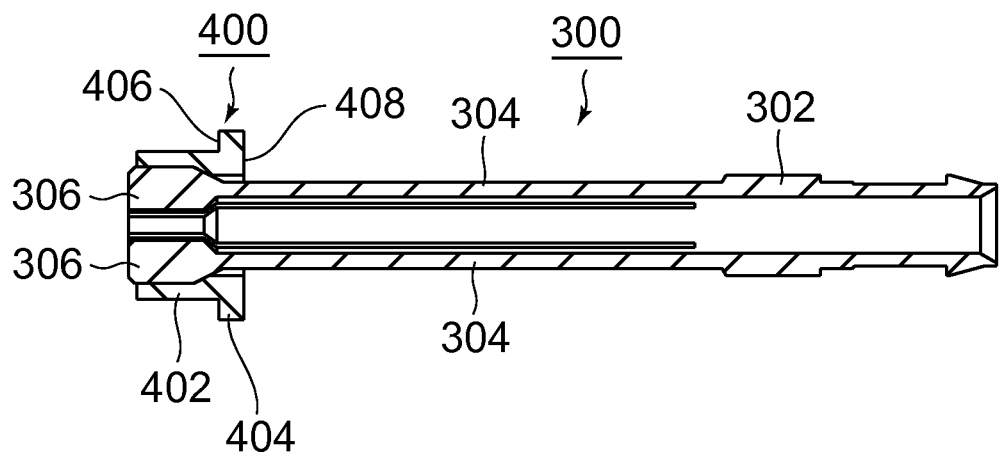
FIG. 12 is a cross-sectional view showing the chuck and the ring of FIG. 11.

When the chuck 300 is in a state (i.e. a hold state) shown in FIGS. 11 and 12, the ring 400 suppresses the holding portions 306 of the chuck 300 from the outside in the radius direction so as to place the holding portions 306 at the hold position. A position of the ring 400 under the hold state of the chuck 300 is referred to as a "maintain position". Each of the holding portions 306 is maintained at the hold position when the ring 400 is located at the maintain position.

As previously described, the rear end portion of the holding portion 306 is a tapered portion which is tapered rearward. Accordingly, the ring 400 is smoothly movable from the outer surface of the resilient portions 304 to the outer surface of the holding portions 306. In other words, the ring 400 is able to smoothly transfer the chuck 300 from the release state (see FIGS. 9 and 10) to the hold state (see FIGS. 11 and 12). Especially, the ring 400 according to the present embodiment has a tapered portion formed on the inner surface of thereof. The tapered portion of the ring 400 has a shape and a size corresponding to the tapered portion of the holding portion 306. Accordingly, when the ring 400 is located at the maintain position (i.e. when the chuck 300 is in the hold state), the ring 400 is prevented from being unsteady (i.e. firmly connected to the holding portions 306).

Figure 4:
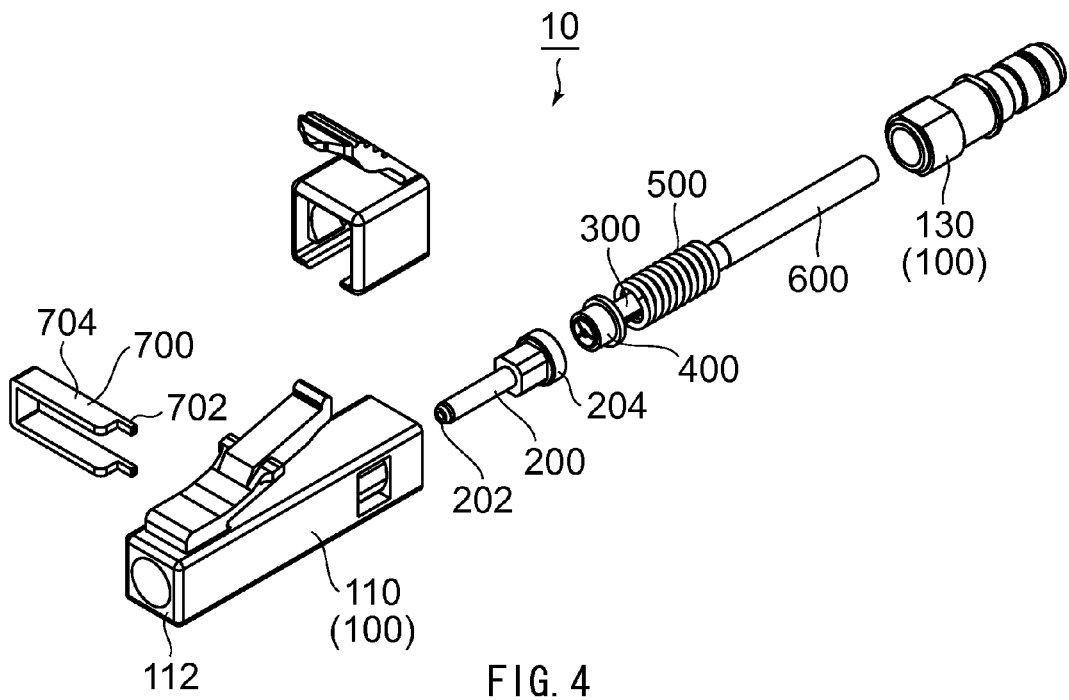
FIG. 4 is a partially exploded, perspective view showing the optical fiber connector of FIG. 3 together with a stopper.

As can be seen from FIGS. 3 and 4, the optical fiber connector 10 is assembled as exemplarily described below. At first, the ferrule 200 is inserted into the accommodating space 116 of the front housing 110 from the rear end 114 of the front housing 110. Similarly, the chuck 300 connected to the tube 600 is inserted into the accommodating space 116 from the rear end 114 together with the ring 400 and the coil spring 500 which are attached to the outer surface of the chuck 300. Then, the back post 130 is installed on the rear end 114 of the front housing 110 while the tube 600 passes through the back post 130 so that the ferrule 200, the chuck 300, the ring 400 and the coil spring 500 are accommodated in the housing 100. When the ferrule 200 and the ring 400 are accommodated in the housing 100, the front end (abutment portion) 406 (see FIG. 8) of the flange 404 of the ring 400 faces the rim portion (facing portion) 208 of the receiving portion 204 of the ferrule 200 in the optical direction. When the optical fiber connector 10 is assembled as described above, the coil spring 500 is interposed between the rear end 408 of the flange 404 of the ring 400 and the front end 132 of the back post 130 (see FIG. 3). More specifically, the coil spring 500 is pressed against the flange 404 of the ring 400 (i.e. presses the ring 400 forward) so as to surround the outer surface of the holding portions 306. Accordingly, the holding portions 306 are maintained at the hold position. As can be seen the above description, the coil spring 500 serves as a pressing member 500 which presses the ring 400 toward the maintain position. The ends (i.e. the front ends) of the holding portions 306, which are maintained at the hold position, are pressed against the receiver 206 of the ferrule 200. As described above, the chuck 300 is brought into abutment with the ferrule 200 under the hold state where the ring 400 is pressed by the coil spring 500 to be located at the maintain position and the chuck 300 is located at the hold position. However, a size of the outline of the holding portions 306 is far smaller than a size of the inner surface of the receiving portion 204 in a plane perpendicular to the optical direction. Moreover, as previously described, the size of the outer surface of the body portion 402 of the ring 400 is smaller than the size of the inner surface of the receiving portion 204. Accordingly, none of the ring 400 and the holding portions 306 of the chuck 300 is fitted in the ferrule 200. The ring 400 and the chuck 300 are therefore easily separable from the ferrule 200 in the optical direction.

As can be seen from FIG. 3, the ferrule 200, the chuck 300 and the ring 400 are movable independently from one another along the optical direction in the accommodating space 116 of the front housing 110. In detail, the housing 100 holds the ferrule 200 so that the ferrule 200 is movable in the optical direction. Similarly, the chuck 300 is accommodated in the housing 100 so as to be movable in the optical direction. The ring 400 is accommodated in the housing 100 so as to be movable relative to the chuck 300 in the optical direction. However, as shown in FIG. 3, the ring 400 is pressed against forward by the coil spring 500. In detail, the ring 400 is pressed against the receiver 206 of the ferrule 200 which is located forward of the ring 400. Accordingly, the ferrule 200, the chuck 300 and the ring 400 move together (i.e. move cooperatively) in the optical direction unless the stopper 700 prevents the ring 400 from moving as described later. For example, if the front end 202 of the ferrule 200 is pushed rearward into the front housing 110, the chuck 300 and the ring 400 move rearward together with the ferrule 200. If the front end 202 of the ferrule 200 is stopped from being pushed into, the ferrule 200 and chuck 300 move forward together with the ring 400 which is pressed by the coil spring 500. As a result, the ferrule 200, the chuck 300 and the ring 400 return to respective positions shown in FIG. 3.

As can be seen from FIGS. 3, 13 and 14, the tube 600 which is attached to the chuck 300 passes through the through hole 136 of the back post 130 to project rearward from the rear end 134. In other words, the tube 600 is accommodated in the housing 100 and connected to the chuck 300 while partially projecting from the housing 100. Accordingly, the chuck 300 is movable in the optical direction by operating the tube 600 as necessary.

Figure 15:
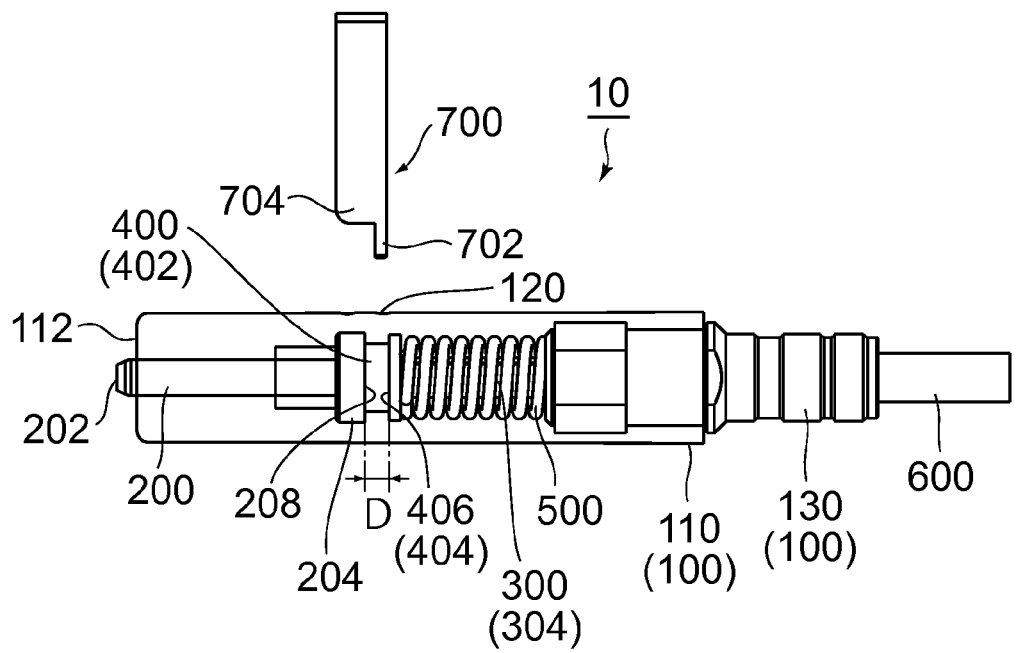
FIG. 15 is a transparent, plan view showing the optical fiber connector and the stopper of FIG. 13.

As shown in FIG. 3, the ferrule 200 is in a most projecting state where the ferrule 200 projects furthest from the front end of the housing 100 (i.e. the front end 112 of the front housing 110) when the chuck 300 is brought into abutment with the ferrule 200. When the ferrule 200 is in the most projecting state, the projecting part of the ferrule 200 has the maximum projecting length. As shown in FIG. 15, if the front end 202 of the ferrule 200 in the most projecting state is pushed rearward into the housing 100, the ferrule 200, the chuck 300 and the ring 400 (i.e. the three members) move rearward together with one another. This movement does not change relative positions of the three members. As can be seen from FIG. 15, the ring 400 pressed by the coil spring 500 is located at the maintain position so that the chuck 300 is in the hold state unless the aforementioned relative positions of the three members are changed. When the relative positions of the three members are kept, the chuck 300 is in abutment with the ferrule 200 while the front end (abutment portion) 406 and the rim portion (facing portion) 208 have a gap (D) therebetween. The gap (D) in the optical direction exists between the rim portion (facing portion) 208 and the front end (abutment portion) 406 unless the relative positions of the three members are changed. As previously described, the size in the optical direction of the body portion 402 of the ring 400 is sufficiently larger than the size in the optical direction of the receiving portion 204 of the ferrule 200. Accordingly, even when the chuck 300 is in abutment with the ferrule 200, the rim portion (facing portion) 208 and the front end (abutment portion) 406 of the flange 404 are not in contact with each other.

Figure 16:
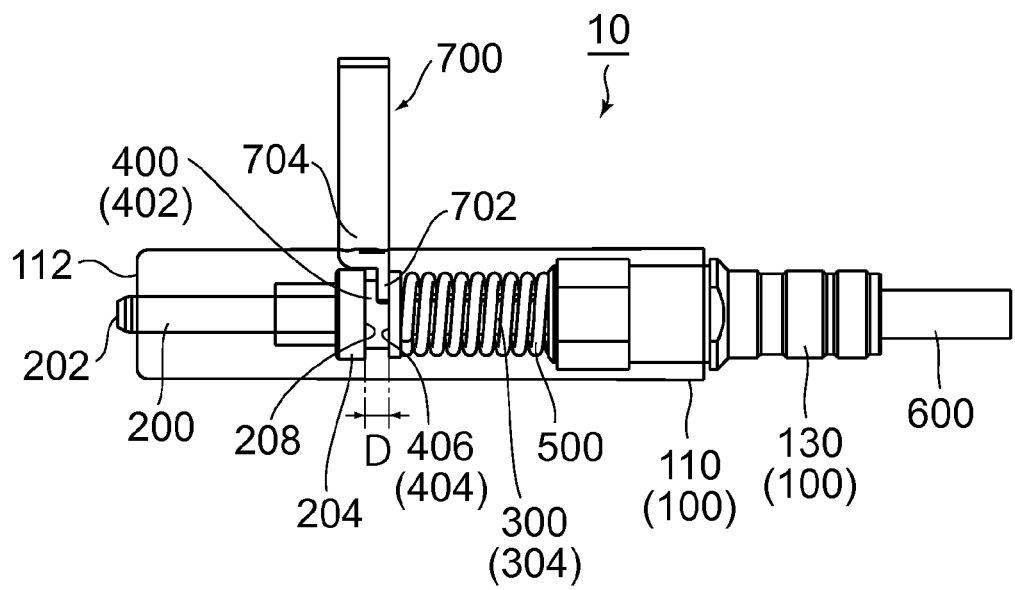
FIG. 16 is a transparent, plan view showing the optical fiber connector and the stopper of FIG. 15 in a state where a narrow portion of the stopper is inserted between the ferrule and a ring (in detail, a flange of the ring) of the optical fiber connector.

As can be seen from FIGS. 14 to 16, the stopper-insert-hole 120 according to the present embodiment is formed on the side surface of the front housing 110. According to the present embodiment, the narrow portion 702 of the stopper 700 is able to be inserted into the gap (D) along an insertion direction perpendicular to the optical direction when the front end 202 of the ferrule 200 is pushed into the housing 100. In other words, the stopper-insert-hole 120 is provided on the housing 100 so as to allow the narrow portion 702 to be inserted into the gap (D) under a state where the ferrule 200 is pushed into the housing 100. As shown in FIG. 16, when the narrow portion 702 of the stopper 700 is inserted in the gap (D), the narrow portion 702 and the front end 406 of the ring 400 are brought into abutment with each other so that the ring 400 is unable to move forward over the stopper 700. In other words, the front end 406 according to the present embodiment serves as the abutment portion 406 which is configured to be brought into abutment with the stopper 700. When the narrow portion 702 stops the ring 400, the ferrule 200 and the chuck 300 are able to move forward without being restricted by the narrow portion 702. Thus, when the stopper 700 is inserted into the gap (D), the cooperative movement in the optical direction of the ring 400 with the ferrule 200 and the chuck 300 is stopped so that the ferrule 200 and the chuck 300 are able to move forward independently from the ring 400. As described above, the insertion direction of the stopper 700 according to the present embodiment is perpendicular to the optical direction. However, the insertion direction may be crossing the optical direction. In other words, the stopper-insert-hole 120, the front end 406 and the rim portion 208 may be configured so that the stopper 700 is insertable into the gap (D) (i.e. between the front end 406 and the rim portion 208) through the stopper-insert-hole 120 along a direction crossing the optical direction.

As shown in FIG. 16, the tube 600 according to the present embodiment projects outward from the back post 130 even when the narrow portion 702 is inserted in the gap (D). When the tube 600 is pushed forward, the chuck 300, which is pressed by the tube 600, moves forward to be apart from the ring 400. In other words, the tube 600 according to the present embodiment is attached to the chuck 300 so as to serve as the release-operation member 600. It is possible to move the ring 400 relative to the chuck 300 by operating the tube 600 so that the ring 400 arrives at the release position. When the ring 400 arrives at the release position, the holding portions 306 of the chuck 300 move outward in the radius direction to be located at the unhold position.

When the chuck 300 is moved to be apart from the ring 400 by the tube 600 which is pushed forward, the ferrule 200 is also pressed by the chuck 300 to be moved forward. When the ferrule 200 moves forward, a distance between the rim portion (facing portion) 208 of the receiving portion 204 of the ferrule 200 and the front end (abutment portion) 406 of the flange 404 of the ring 400 becomes larger than the size of the gap (D). Accordingly, as can be seen from FIGS. 17 and 18, the stopper 700 is able to be further pushed into the stopper-insert-hole 120 so that the broad portion 704 of the stopper 700 is inserted between the rim portion (facing portion) 208 of the receiving portion 204 of the ferrule 200 and the front end (abutment portion) 406 of the flange 404 of the ring 400. The broad portion 704 located between the rim portion 208 and the front end 406 keeps the ferrule 200 in a state (see FIG. 17) where the ferrule 200 projects relatively large from the front end of the housing 100 (i.e. the front end 112 of the front housing 110). When the broad portion 704 is thus located, the rim portion 208 and the front end 406 are kept to be apart from each other in the optical direction by a predetermined distance which is defined by the size (i.e. the width) of the broad portion 704. In other words, the ring 400 which is pressed by the coil spring 500 keeps a position located apart from the ferrule 200 in the optical direction by the predetermined distance defined by the size of the broad portion 704 (i.e. the size of the stopper 700) while resisting the coil spring 500 under an inserted state where the broad portion 704 (i.e. the stopper 700) is inserted between the front end (abutment portion) 406 and the rim portion (facing portion) 208. The ferrule 200 is held stably so as not to be shaken even when the broad portion 704 having a width of the predetermined distance is inserted.

The stopper 700 is able to be inserted between the rim portion (facing portion) 208 of the receiving portion 204 of the ferrule 200 and the front end (abutment portion) 406 of the flange 404 of the ring 400 by the other processes than the aforementioned process. For example, the stopper 700 may be formed with an intermediate portion between the narrow portion 702 and the broad portion 704. A width of the intermediate portion may be designed to gradually change between the narrow portion 702 and the broad portion 704. When thus configured stopper 700 is pushed into the stopper-insert-hole 120 from the position shown in FIG. 16 to the position shown in FIG. 17, the ferrule 200 may be moved forward without operating the tube 600. When the ferrule 200 moves forward, the broad portion 704 (i.e. the stopper 700) is located between the rim portion (facing portion) 208 of the receiving portion 204 of the ferrule 200 and the front end (abutment portion) 406 of the flange 404 of the ring 400. When the broad portion 704 is located between the rim portion 208 and the front end 406 (i.e. when the stopper 700 is in the inserted state), it is possible to move only the chuck 300 in the optical direction to release the held optical fiber (not shown) while restricting the movement in the optical direction of the ferrule 200 and the ring 400. As can be seen from the above description, the chuck 300 is accommodated in the housing 100 so as to be able to transit between the hold sate where the chuck 300 holds the optical fiber (not shown) and the release state where the chuck 300 releases the optical fiber (not shown). The ring 400 is locatable at the maintain position where the ring 400 maintains the chuck 300 in the hold state and the release position where the chuck 300 is able to transit to the release state. In detail, the ring 400 moves relative to the chuck 300 when the chuck 300 moves under the inserted state of the stopper 700. The chuck 300 releases the optical fiber (not shown) when the ring 400 is relatively moved to the release position.

Figure 17:
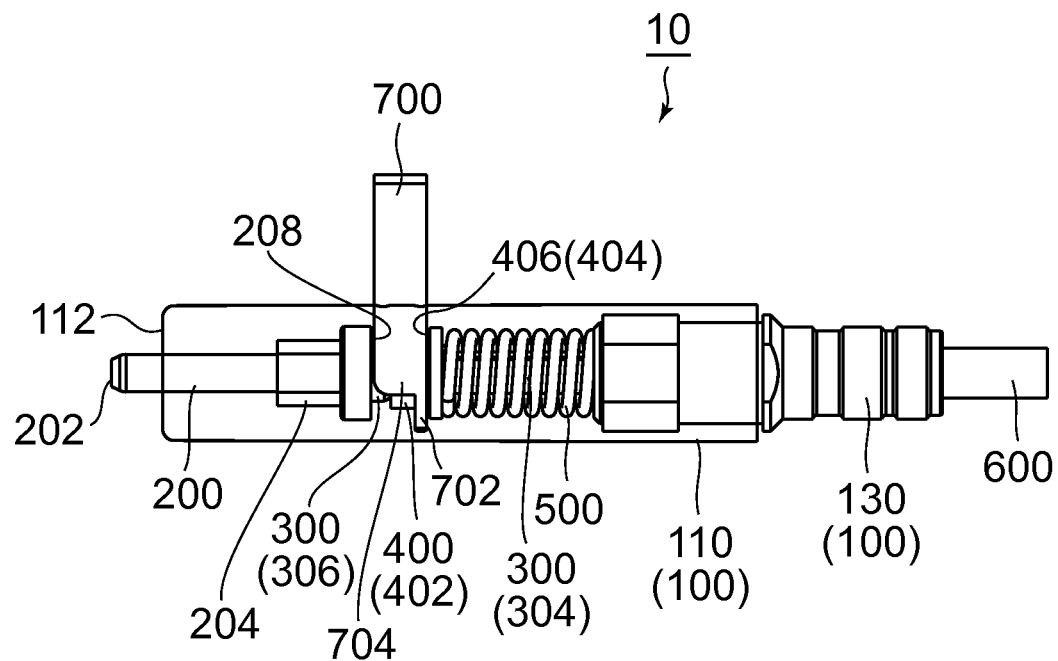
FIG. 17 is a transparent, plan view showing the optical fiber connector and the stopper of FIG. 15 in a state where a broad portion of the stopper is inserted between the ferrule and the flange.
Figure 18:
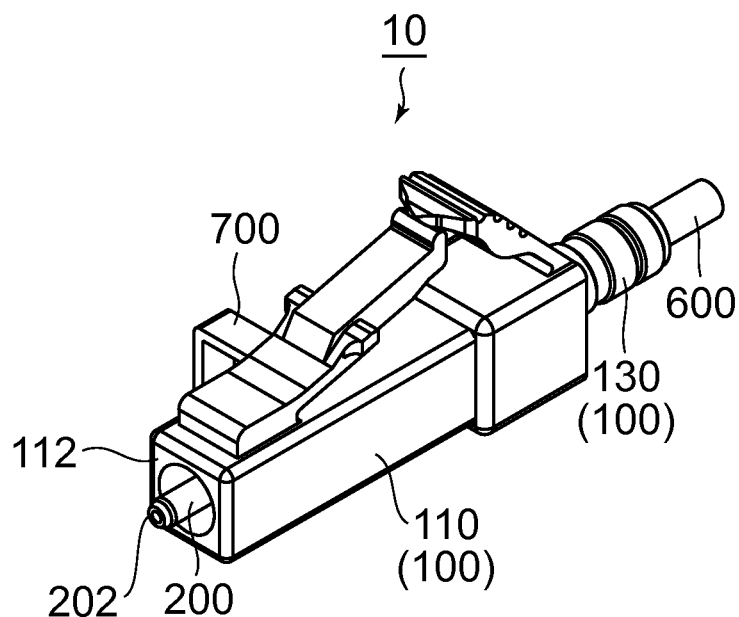
FIG. 18 is a perspective view showing the optical fiber connector and the stopper of FIG. 17.

As described above, when the chuck 300 moves forward under the inserted state of the stopper 700, the chuck 300 keeps a state where the chuck 300 opens (i.e. the release state where the holding portions 306 are located at the unhold position). Accordingly, it is possible to freely move the optical fiber (not shown) along the optical direction in the optical fiber connector 10. For example, the optical fiber connector 10 under a state shown in FIGS. 17 and 18 is able to be attached to the end of the optical fiber (not shown) as described below. At first, the optical fiber (not shown) is inserted into the tube 600 so as to project outward from the front end 202 of the ferrule 200. Then, the stopper 700 is removed so that the ring 400 moves forward to close the chuck 300. In detail, the ring 400 relatively moves from the release position to the maintain position so that the chuck 300 moves from the unhold position to the hold position (i.e. transits from the release state to the hold state). The chuck 300 under the hold state holds the optical fiber (not shown) which passes through the tube 600. Moreover, the chuck 300 is pressed against the ferrule 200 while holding the optical fiber (not shown). Then, a part of the optical fiber (not shown) which projects from the front end 202 of the ferrule 200 is cut. As can be seen from the above description, the optical fiber (not shown) is easily attachable to the optical fiber connector 10 by inserting the optical fiber (not shown) under the inserted state of the stopper 700. More specifically, as previously described, according to the present embodiment, the optical fiber connector 10 is able to be assembled with all members except the optical fiber (not shown) before the optical fiber (not shown) is attached to the optical fiber connector 10. Accordingly, an assembly worker can attach the optical fiber (not shown) without assembling the optical fiber connector 10 by itself. It is therefore possible not only to reduce a working time largely but also to get rid of a problem such as a missing of members during the assembling.

The optical fiber (not shown) attached to the optical fiber connector 10 can be exchanged by a process similar to the process described by using FIGS. 15 to 18. More specifically, the held optical fiber (not shown) is transferred to a state where the optical fiber (not shown) is freely movable along the optical direction. Then, the optical fiber (not shown) is removed. Then, another optical fiber (not shown) is inserted into the tube 600 so as to project from the front end 202 of the ferrule 200. The inserted optical fiber (not shown) is processed as previously described. As can be seen from the above description, according to the present embodiment, the optical fiber (not shown) is exchangeable without disassembling the optical fiber connector 10. Accordingly, the optical fiber connector 10 might not be damaged even if the optical fiber (not shown) is repeatedly exchanged. Moreover, when the optical fiber connector 10 comprises the tube 600, it is possible to operate the chuck 300 from the outside of the housing 100 by the tube 600. The chuck 300 operated by the tube 600 moves so that the relative position of the ring 400 to the chuck 300 changes to the release position. According to the present embodiment, the optical fiber (not shown) is released more reliably so that the optical fiber (not shown) is exchanged more smoothly.

The holding member and the maintaining member according to the embodiment described above are the chuck 300 and the ring 400, respectively. However, the holding member may be another member if the optical fiber is able to be held releasably. Similarly, the maintaining member may be another member if the holding by the holding member is able to be maintained releasably. Moreover, the holding structure comprised of the holding member and the maintaining member may not be the combination of the chuck 300 and the ring 400.

The chuck (holding member) 300 according to the embodiment described above has a plurality of the holding portions 306 and a plurality of the resilient portions 304 which resiliently support the respective holding portions 306. However, the holding member may be configured differently. For example, the holding member may has a pole portion which extends forward from the base portion 302 in addition to the one set of the one holding portions 306 and the one resilient portions 304. The pole portion may be formed so as not to be resiliently deformed, practically or at all. In this case, the holding member may be configured so that the holding portion 306 and the pole portion interpose the optical fiber to hold the optical fiber. More specifically, only the resilient portion 304 may be resiliently deformed so that the holding portion 306 is pressed toward the pole portion.

The ring 400 according to the embodiment described above is configured to position the holding portions 306 at the hold position by suppressing the holding portions 306 from the outside in the radius direction. However, the ring 400 may be configured differently. For example, the ring 400 may position the holding portions 306 at the hold position by suppressing not the holding portions 306 but the resilient portions 304 from the outside in the radius direction. Moreover, the ring 400 may position the holding portions 306 at the hold position by suppressing both the holding portions 306 and the resilient portions 304 from the outside in the radius direction. In other words, the ring 400 located at the maintain position may suppress at least one of the holding portion 306 and the resilient portion 304 inward in the radius direction so as to resiliently deform the resilient portion 304 to place the holding portion 306 at the hold position.

According to the embodiment described above, the tube (release-operation member) 600 which is attached to the chuck (holding member) 300 is operated so that the chuck 300 moves in the optical direction. However, the release-operation member may be configured differently. For example, the base portion 302 of the chuck 300 may extend rearward so as to partially project from the back post 130 (i.e. the housing 100). In this case, the projecting part of the base portion 302 may be used as the release-operation member. As can be seen from the above description, the release-operation member, similar to the present embodiment, may be formed separately from the holding member while the release-operation member may be formed integrally with the holding member.

The present application is based on a Japanese patent application of JP2012-018210 filed before the Japan Patent Office on Jan. 31, 2012, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An optical fiber connector configured to hold an optical fiber having an end and to be operable by a stopper, the optical fiber connector comprising:
    a ferrule having a facing portion, the ferrule being able to accommodate the end of the optical fiber;
    a housing having a side surface which is formed with a stopper-insert-hole, the housing holding the ferrule so that the ferrule is movable in an optical direction which is parallel to an optical axis of the held optical fiber;
    a holding member accommodated in the housing so as to be movable in the optical direction and to be able to transit between a hold state where the holding member holds the optical fiber and a release state where the holding member releases the optical fiber;
    a maintaining member having an abutment portion, the maintaining member being accommodated in the housing so as to be movable relative to the holding member in the optical direction, the maintaining member being locatable at a maintain position where the maintaining member maintains the holding member in the hold state and a release position where the holding member is able to transit to the release state, the abutment portion facing the facing portion of the ferrule in the optical direction so that the stopper is insertable between the abutment portion and the facing portion through the stopper-insert-hole along a direction crossing the optical direction; and
    a pressing member pressing the maintaining member toward the maintain position, the pressed maintaining member keeping a position located apart from the ferrule in the optical direction by a predetermined distance defined by a size of the stopper while resisting the pressing member under an inserted state where the stopper is inserted between the abutment portion and the facing portion.

2. The optical fiber connector as recited in claim 1, further comprising a release-operation member, wherein:
    the release-operation member is accommodated in the housing and connected to the holding member while partially projecting from the housing;
    the holding member is movable in the optical direction by operating the release-operation member;
    when the holding member moves under the inserted state, the maintaining member moves relative to the holding member; and
    the holding member releases the optical fiber when the maintaining member is relatively moved to the release position.

3. The optical fiber connector as recited in claim 2, further comprising a tube, wherein:
    the tube is attached to the holding member so as to serve as the release-operation member; and the holding member under the hold state holds the optical fiber which passes through the tube.

4. The optical fiber connector as recited in claim 1, wherein:
the holding member has a base portion, a resilient portion and a holding portion;
the resilient portion extends from the base portion, the resilient portion under an initial state resiliently supporting the holding portion so that the holding portion is located at an unhold position where the holding portion unholds the optical fiber;
the holding portion is movable by resiliently deforming the resilient portion to a hold position where the holding portion holds the optical fiber;
the unhold position is located outer than the hold position in a radial direction of the held optical fiber;
the holding portion is located at the unhold position when the maintaining member is located at the release position; and
when the maintaining member is located at the maintain position, the maintaining member suppresses at least one of the holding portion and the resilient portion inward in the radial direction so as to resiliently deform the resilient portion to place the holding portion at the hold position.

5. The optical fiber connector as recited in claim 4, wherein:
the holding member has a plurality of sets, each set comprising one holding portion and one resilient portion, for one optical fiber so that the holding member has a holding group comprising a plurality of the holding portions and a resilient group comprising a plurality of the resilient portions; and
the maintaining member is adapted to enclose at least one of the holding group and the resilient group from the outside in the radial direction.

6. The optical fiber connector as recited in claim 4, wherein:
the optical fiber connector is configured so that the end of the held optical fiber faces forward in the optical direction;
the pressing member presses the maintaining member forward; and
the maintaining member has a body portion and a flange, the body portion having a cylindrical shape which encloses at least one of the resilient portion and the holding portion from the outside in the radial direction, the flange being provided at a rear side of the body portion so as to have a front end which serves as the abutment portion.

7. The optical fiber connector as recited in claim 1, wherein:
the stopper has a broad portion and a narrow portion, the broad portion having a width of the predetermined distance, the narrow portion having a width smaller than the broad portion;
when the maintaining member pressed by the pressing member is located at the maintain position so that the holding member is in the hold state, the holding member is in abutment with the ferrule while the abutment portion and the facing portion have a gap therebetween; and
the stopper-insert-hole is provided on the housing so as to allow the narrow portion to be inserted into the gap under a state where the ferrule is pressed into the housing.

8. The optical fiber connector as recited in claim 2, wherein:
the housing includes a front housing and a back post, the front housing having an accommodating space formed therewithin, the back post having a cylindrical shape; and
after the ferrule, the holding member connected to the release-operation member, the maintaining member and the pressing member are inserted into the accommodating space of the front housing from a rear end of the front housing, the back post is installed on the rear end of the front housing while the release-operation member passes through the back post so that the ferrule, the holding member, the maintaining member and the pressing member are accommodated in the housing.

* * * * *